United States Patent
Bridges et al.

(10) Patent No.: US 9,483,098 B2
(45) Date of Patent: Nov. 1, 2016

(54) CIRCUITS, SYSTEMS AND METHODS TO DETECT AND ACCOMMODATE POWER SUPPLY VOLTAGE DROOP

(75) Inventors: Jeffrey Todd Bridges, Raleigh, NC (US); Sanjay B. Patel, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 945 days.

(21) Appl. No.: 12/752,515

(22) Filed: Apr. 1, 2010

(65) Prior Publication Data

US 2011/0241423 A1   Oct. 6, 2011

(51) Int. Cl.
*H02J 3/14*   (2006.01)
*G06F 1/30*   (2006.01)

(52) U.S. Cl.
CPC ............ *G06F 1/305* (2013.01); *Y10T 307/406* (2015.04)

(58) Field of Classification Search
CPC ....... H02J 3/14; G06F 1/305; Y10T 307/406
USPC .......................................................... 307/31
See application file for complete search history.

(56) References Cited

U.S. PATENT DOCUMENTS

| | | | |
|---|---|---|---|
| 4,095,165 A | 6/1978 | Boros | |
| 5,945,817 A * | 8/1999 | Nguyen | ........................ 323/273 |
| 6,466,077 B1 | 10/2002 | Miyazaki et al. | |
| 6,542,440 B1 * | 4/2003 | Kihara | .................. G04G 19/12 368/156 |
| 6,882,238 B2 * | 4/2005 | Kurd | ........................ G01K 7/32 331/185 |
| 6,946,846 B2 * | 9/2005 | Corr | ................. G01R 19/16552 324/522 |
| 7,161,815 B2 * | 1/2007 | Mori | ................. H02M 3/33507 363/21.12 |
| 7,514,974 B2 | 4/2009 | Block et al. | |
| 7,609,040 B1 * | 10/2009 | Jain | ............................... 323/283 |
| 7,679,407 B2 * | 3/2010 | Reggiardo | ........... A61B 5/0002 327/58 |
| 2003/0112038 A1 | 6/2003 | Naffziger et al. | |
| 2004/0183613 A1 | 9/2004 | Kurd et al. | |
| 2005/0022042 A1 | 1/2005 | Tam et al. | |
| 2008/0122421 A1 | 5/2008 | Hsieh et al. | |
| 2008/0278223 A1 | 11/2008 | Kernahan et al. | |

OTHER PUBLICATIONS

International Search Report and Written Opinion—PCT/US2011/030360, ISA/EPO—Jul. 12, 2011.

\* cited by examiner

*Primary Examiner* — Rexford Barnie
*Assistant Examiner* — Joseph Inge
(74) *Attorney, Agent, or Firm* — Paul Holdaway; Joseph Agusta (57) ABSTRACT

Circuits, systems, and methods for monitoring a power supply voltage and determining if the power supply voltage has drooped are disclosed. In one embodiment, a voltage monitoring circuit is provided and configured to determine if the power supply voltage supplied to a functional circuit has drooped. When no droop of the power supply voltage is detected, the voltage monitoring circuit is configured to provide an indication to the functional circuit to operate in a first mode. When droop of the power supply voltage is detected, the voltage monitoring circuit is configured to provide an indication to the functional circuit to operate in a second mode. In this manner, operating margin in the power supply may be reduced since the functional circuit may be configured to properly operate when a voltage droop of the power supply voltage occurs.

29 Claims, 9 Drawing Sheets

CIRCUITS, SYSTEMS AND METHODS TO DETECT AND ACCOMMODATE POWER SUPPLY VOLTAGE DROOP

BACKGROUND

I. Field of the Disclosure

The technology of the disclosure relates generally to circuits and related systems and methods to monitor a power supply voltage coupled to a functional circuit.

II. Background

Circuits such as central processing units (CPUs) or digital signal processors (DSPs) require power to operate. In this regard, a power supply provides a supply voltage to the circuit. During normal operation of a circuit, a power supply may undergo a supply voltage droop. A power supply voltage droop is a temporary drop or reduction in a power supply voltage being supplied by a power supply. Such behavior may be associated with a switching power supply. Reasons for a power supply voltage drop may include an increase in power supply current supplied by the power supply, a drop in supply voltage being provided to the power supply, an operational change to the power supply, the like, or any combination thereof. The increase in power supply current may be as a result of changes in the power supply and changes in a load receiving the power supply current.

For example, in a CPU that is supplied power from a switching power supply and is executing instructions, typical current consumption may be on the order of tens of milliamps (mA). However, if the CPU executes back-to-back hardware multiplies, current consumption may peak at about one (1) amp (A), thereby causing a supply voltage droop. As long as the voltage droop does not cause the voltage level provided by the power supply to the CPU to be below the minimum acceptable operating voltage of the CPU, the CPU continues to function properly. The difference between the power supply voltage provided to compensate for voltage droops and the minimum acceptable operating voltage of a circuit is the operating margin of the power supply voltage. The operating margin represents additional voltage that must be supplied to the circuit to assure proper circuit operation when power supply voltage droop events occur.

If the magnitude of a power supply voltage droop could be decreased or the effects of power supply voltage droop events could be mitigated, the operating margin could be reduced.

SUMMARY OF THE DISCLOSURE

Embodiments disclosed herein include circuits, systems, and methods for monitoring a power supply voltage and determining if the power supply voltage has drooped. A voltage droop is a temporary drop in power supply voltage. In one embodiment, a voltage monitoring circuit is provided. The voltage monitoring circuit is configured to receive a signal indicative of a power supply voltage associated with a functional circuit. The voltage monitoring circuit is further configured to determine if the power supply voltage has drooped. When no droop of the power supply voltage is detected, the voltage monitoring circuit is configured to provide an indication to the functional circuit to operate in a first mode. However, when droop of the power supply voltage is detected, the voltage monitoring circuit is configured to provide an indication to the functional circuit to operate in a second mode. Further, the indication to the functional circuit to operate in the second mode may allow the functional circuit to continue to operate during voltage droop in the power supply.

In another embodiment, a method for limiting power supply voltage droop is provided. The method includes receiving a first signal indicative of a power supply voltage associated with supplying power to a functional circuit, which is configured to operate in one of a first mode and a second mode. The method also includes determining if the power supply voltage has drooped. When no droop is detected in the power supply voltage, the first mode is selected. When droop is detected in the power supply voltage, the second mode is selected, wherein operating in the second mode allows operation of the functional circuit, despite the droop.

In another embodiment, a system for detecting power supply voltage droop is provided. The system includes a functional circuit. The system also includes a voltage monitoring circuit configured to receive a signal indicative of a power supply voltage associated with supplying power to a functional circuit. The voltage monitoring circuit is configured determine if the power supply voltage has drooped. When no droop of the power supply voltage is detected, the voltage monitoring circuit is configured to provide an indication to the functional circuit to operate in a first mode. When droop of the power supply voltage is detected, the voltage monitoring circuit is configured to provide an indication to the functional circuit to operate in a second mode. The functional circuit may be configured to continue to operate in the second mode when droop in the power supply voltage is detected.

DETAILED DESCRIPTION

With reference now to the drawing figures, several exemplary embodiments of the present disclosure are described.

The word "exemplary" is used herein to mean "serving as an example, instance, or illustration." Any embodiment described herein as "exemplary" is not necessarily to be construed as preferred or advantageous over other embodiments.

Embodiments disclosed herein include circuits, systems, and methods for monitoring a power supply voltage and determining if the power supply voltage has drooped. A voltage droop is a temporary drop in power supply voltage. In one embodiment, a voltage monitoring circuit is provided. The voltage monitoring circuit is configured to receive a signal indicative of a power supply voltage associated with a functional circuit. The voltage monitoring circuit is further configured to determine if the power supply voltage has drooped. When no droop of the power supply voltage is detected, the voltage monitoring circuit is configured to provide an indication to the functional circuit to operate in a first mode. However, when droop of the power supply voltage is detected, the voltage monitoring circuit is configured to provide an indication to the functional circuit to operate in a second mode. Further, the indication to the functional circuit to operate in the second mode may allow the functional circuit to continue to operate during voltage droop in the power supply. In this manner, operating margin in the power supply may be reduced or eliminated since the functional circuit may be configured to properly operate when a power supply voltage droop occurs instead of the power supply providing a higher voltage to compensate for power supply voltage droop.

As an example, in the first mode, the functional circuit may operate using a normal clock frequency and a normal power supply current demand. In the second mode, the functional circuit may operate using a reduced clock frequency or other reduced performance to reduce power supply current demand. As a result, the minimum acceptable operating voltage may be lowered for the functional circuit in the second mode thereby allowing the functional circuit to properly operate when a power supply voltage droop occurs.

Figure 1:
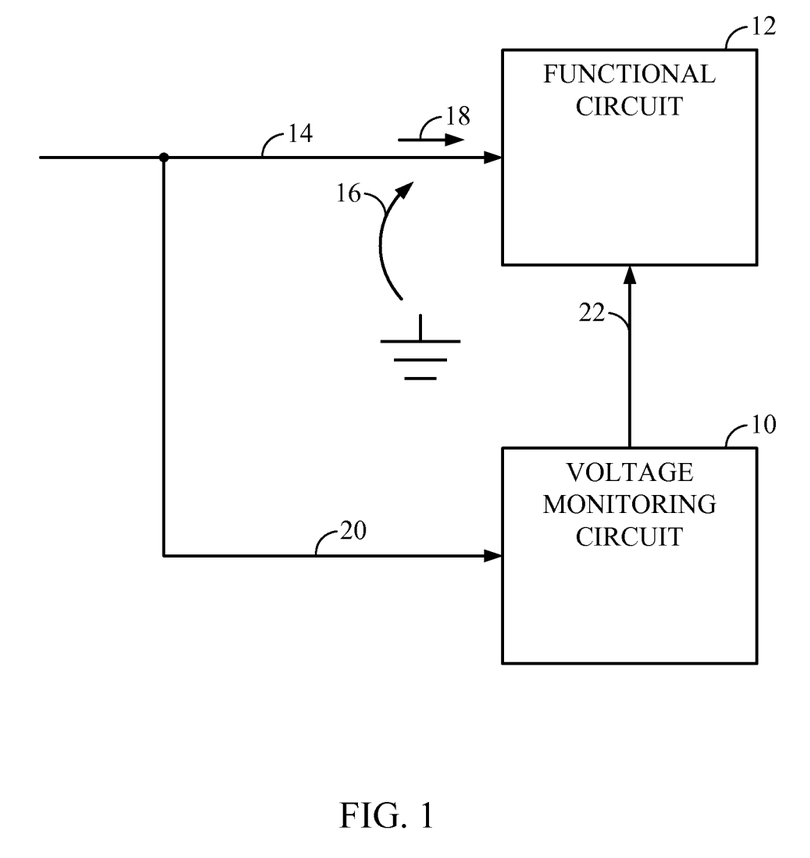
FIG. 1 is a block diagram of an exemplary voltage monitoring circuit and an exemplary functional circuit.

In this embodiment, as illustrated in FIG. 1, a power supply signal 14 having a power supply voltage 16 and a power supply current 18 supplies power to a functional circuit 12 as shown in FIG. 1. The voltage monitoring circuit 10 receives a signal 20 indicative of the power supply voltage 16, as shown in FIG. 1. The voltage monitoring circuit 10 determines if the power supply voltage 16 has drooped. The signal 20 illustrated in FIG. 1 has the power supply voltage 16. Other embodiments of the signal 20 may indirectly represent the power supply voltage 16.

Figure 2A:
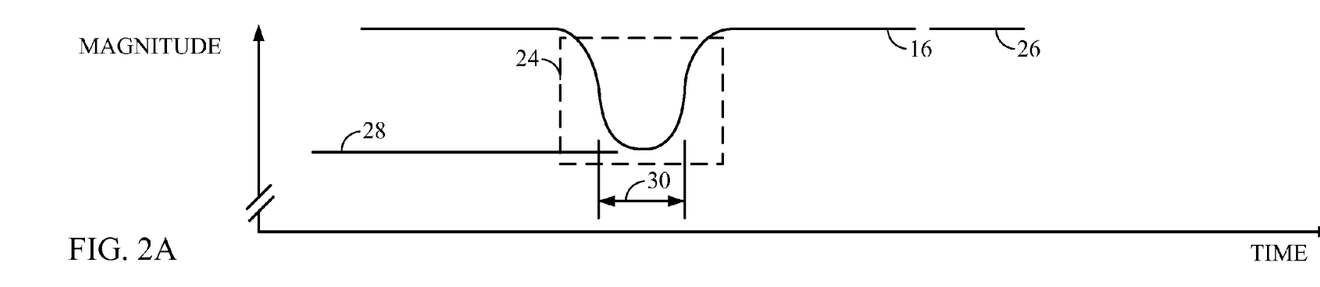
FIGS. 2A-2C are three exemplary timing diagrams of voltage droop events of a power supply voltage associated with the exemplary voltage monitoring circuit illustrated in FIG. 1.

A power supply voltage droop 24 is illustrated by example in FIG. 2A. A power supply voltage droop is defined as a temporary drop in the power supply voltage 16. The power supply voltage 16 normally has a nominal power supply voltage 26. However, during the power supply voltage droop 24, the power supply voltage 16 may drop to a minimum droop voltage 28. The power supply voltage droop 24 has a droop duration 30, which may last for tens (10 s) of microseconds as an example. When no power supply voltage droop is detected, the voltage monitoring circuit 10 provides an indication to the functional circuit 12 using mode status information 22, as illustrated in FIG. 1, to operate in a first mode. However, when a power supply voltage droop is detected, the voltage monitoring circuit 10 provides an indication to the functional circuit 12 using the mode status information 22 to operate in a second mode. The second mode may allow the functional circuit 12 to continue operating during a power supply voltage droop 24.

Figure 2B:
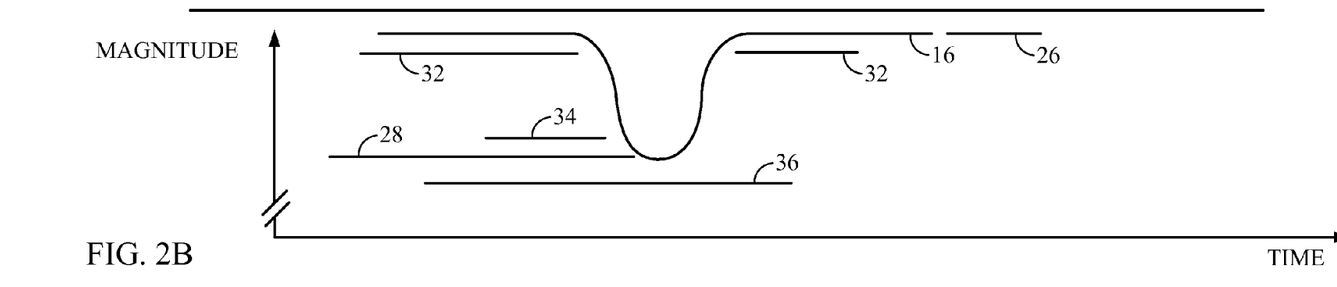

FIG. 2B illustrates an exemplary behavior of the functional circuit 12 during a power supply voltage droop 24 according to a first embodiment of the functional circuit 12. When a power supply voltage droop 24 begins, the power supply voltage 16 drops below a droop detection threshold 32, which causes the voltage monitoring circuit 10 to determine that the power supply voltage 16 has drooped. As a result, the voltage monitoring circuit 10 sends an indication to the functional circuit 12 to switch from operating in the first mode to operating in the second mode using the mode status information 22. While operating in the first mode, the functional circuit 12 has a first minimum acceptable operating voltage 34 in this embodiment. The first minimum acceptable operating voltage 34 is the minimum acceptable operating voltage at which the functional circuit 12 will properly operate during normal performance or load conditions. The first minimum acceptable operating voltage 34 is greater than the minimum droop voltage 28. Thus, the functional circuit 12 will not properly operate at the minimum droop voltage 28.

However, while operating in the second mode, the functional circuit 12 has a second minimum acceptable operating voltage 36 which is less than the first minimum acceptable operating voltage 34. The second minimum acceptable operating voltage 36 is the minimum acceptable operating voltage at which the functional circuit 12 will properly operate during reduced performance or load conditions. The second minimum acceptable operating voltage 36 is less than the minimum droop voltage 28. Thus, the functional circuit 12 will properly operate at the minimum droop voltage 28 when the performance or load conditions of the functional circuit 12 are reduced such that the minimum acceptable operating voltage of the functional circuit 12 is the second minimum acceptable operating voltage 36. As a result, the functional circuit 12 may continue to operate during the power supply voltage droop 24 (FIG. 2B). When the power supply voltage 16 returns to the nominal power supply voltage 26, which is above the droop detection threshold 32, the voltage monitoring circuit 10 may send an indication to the functional circuit 12 to switch from operating in the second mode to operating in the first mode using the mode status information 22.

Figure 2C:
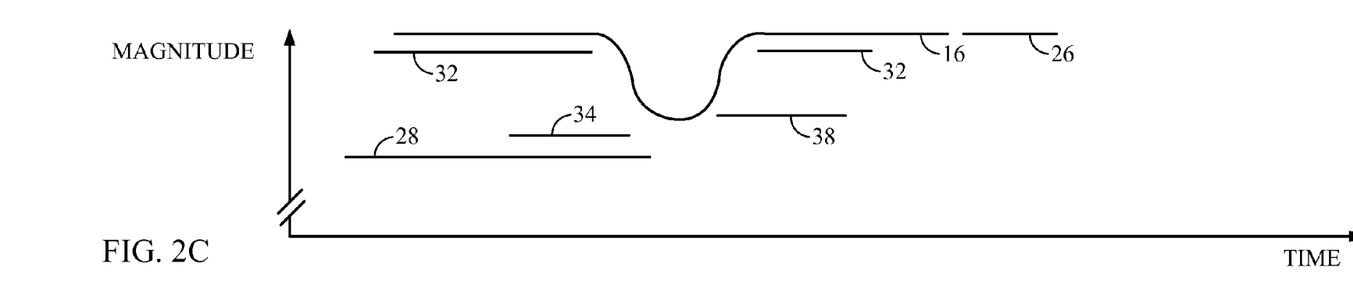

FIG. 2C illustrates behavior of the functional circuit 12 during a power supply voltage droop 24 according to a second embodiment of the functional circuit 12. While operating in both the first mode and the second mode, the functional circuit 12 may have the first minimum acceptable operating voltage 34. When a power supply voltage droop 24 begins, the power supply voltage 16 drops below the droop detection threshold 32, which causes the voltage monitoring circuit 10 to determine that the power supply voltage 16 has drooped. As a result, the voltage monitoring circuit 10 sends an indication to the functional circuit 12 to switch from operating in the first mode to operating in the second mode using the mode status information 22. While operating in the first mode, a current load presented by the functional circuit 12 causes the power supply current 18 to have a first magnitude, and while operating in the second mode, the current load presented by the functional circuit 12 causes the power supply current 18 to have a second magnitude, which is less than the first magnitude. By reducing the power supply current 18, the severity of the droop may be reduced, thereby increasing the minimum droop voltage 28 to a modified minimum droop voltage 38, which may be greater than the first minimum acceptable operating voltage 34. As such, the functional circuit 12 may continue operating during the power supply voltage droop 24.

A third embodiment of the functional circuit 12 combines the first and the second embodiments of the functional circuit 12. In this manner, while operating in the first mode, the functional circuit 12 has the first minimum acceptable operating voltage 34. The current load presented by the functional circuit 12 causes the power supply current 18 to have the first magnitude. While operating in the second mode, the functional circuit 12 has the second minimum acceptable operating voltage 36 and the current load presented by the functional circuit 12 causes the power supply current 18 to have the second magnitude. The second minimum acceptable operating voltage 36 is less than the first minimum acceptable operating voltage 34 and the second magnitude is less than the first magnitude.

Figure 3:
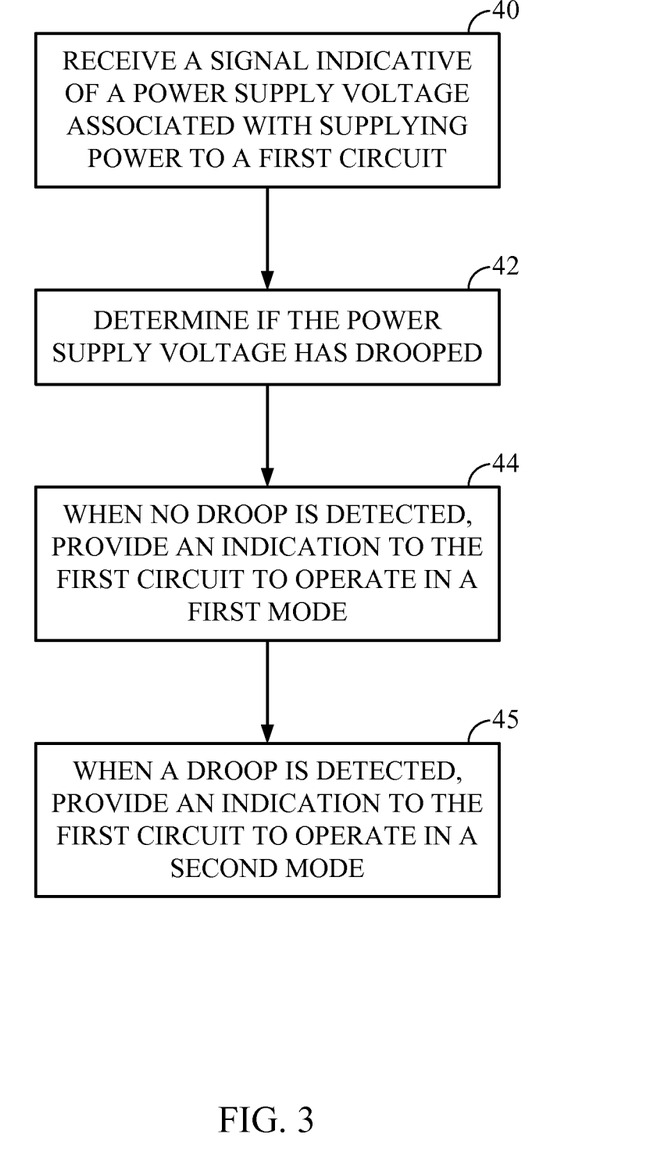
FIG. 3 is an exemplary flowchart of a process for monitoring the power supply voltage using the exemplary voltage monitoring circuit illustrated in FIG. 1.

FIG. 3 is a flowchart that further illustrates exemplary operation of the voltage monitoring circuit 10 in FIG. 1 for monitoring a power supply voltage and determining if the supply voltage has drooped. In this regard, the voltage monitoring circuit 10 receives a signal 20 indicative of the power supply voltage 16 (block 40). The voltage monitoring circuit 10 determines if the power supply voltage 16 has drooped (block 42). When no power supply voltage droop is detected, the voltage monitoring circuit 10 provides an indication to the functional circuit 12 using mode status information 22 to operate in a first mode (block 44). However, when a power supply voltage droop is detected, the voltage monitoring circuit 10 provides an indication to the functional circuit 12 using the mode status information 22 to operate in a second mode (block 45). The second mode may allow the functional circuit 12 to continue operating during a power supply voltage droop 24.

Figure 4:
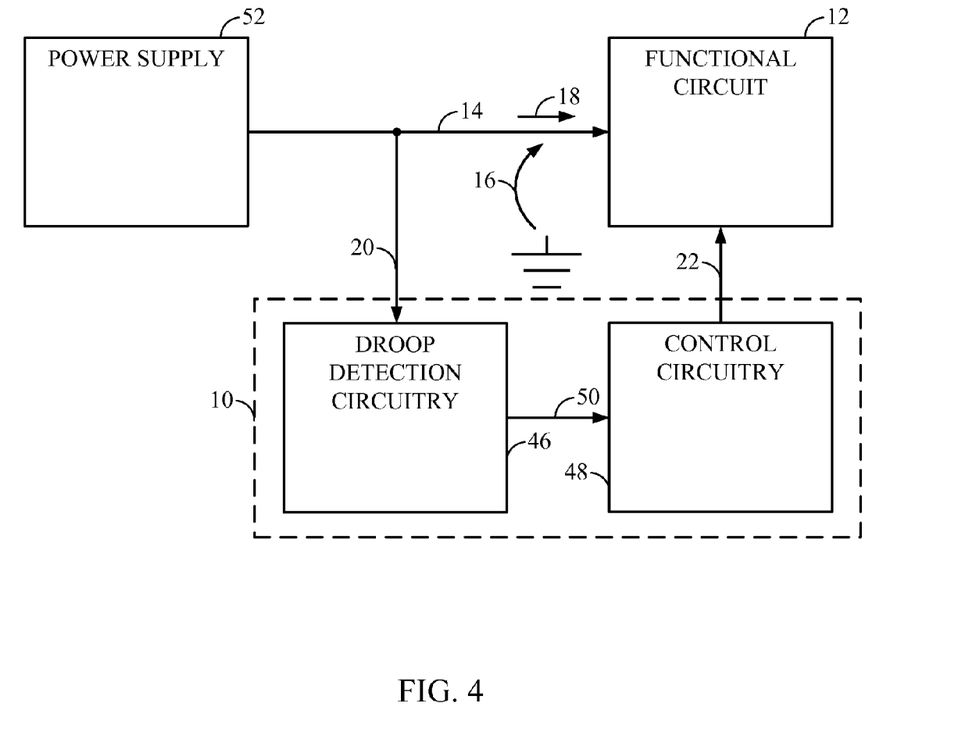
FIG. 4 is a block diagram of an alternate exemplary voltage monitoring circuit, the exemplary functional circuit, and an exemplary power supply.

A power supply provides a power supply signal 14 to the functional circuit 12. In this regard, FIG. 4 is a block diagram of an embodiment of the voltage monitoring circuit 10 and the functional circuit 12 of FIG. 1 with the addition of a power supply 52. The power supply 52 provides the power supply signal 14 to the functional circuit 12 in this embodiment. The voltage monitoring circuit 10 includes droop detection circuitry 46 and control circuitry 48 in this embodiment. The droop detection circuitry 46 receives the signal 20 and determines if the power supply voltage 16 has drooped based on the signal 20. The droop detection circuitry 46 provides droop status information 50 to the control circuitry 48 based on detecting if the power supply voltage 16 has drooped.

When no voltage droop is detected in the power supply signal 14, the control circuitry 48 selects the first mode based on the droop status information 50. However, when a voltage droop is detected in the power supply signal 14, the control circuitry 48 selects the second mode based on the droop status information 50. Operating the functional circuit 12 in the second mode may allow proper operation of the functional circuit 12 during a voltage droop of the power supply signal 14 from the power supply 52. As a result, the functional circuit 12 may continue to operate during a voltage droop of the power supply signal 14 without increasing operating voltage and, as a result, increasing operating margin of the power supply 52.

Figure 5:
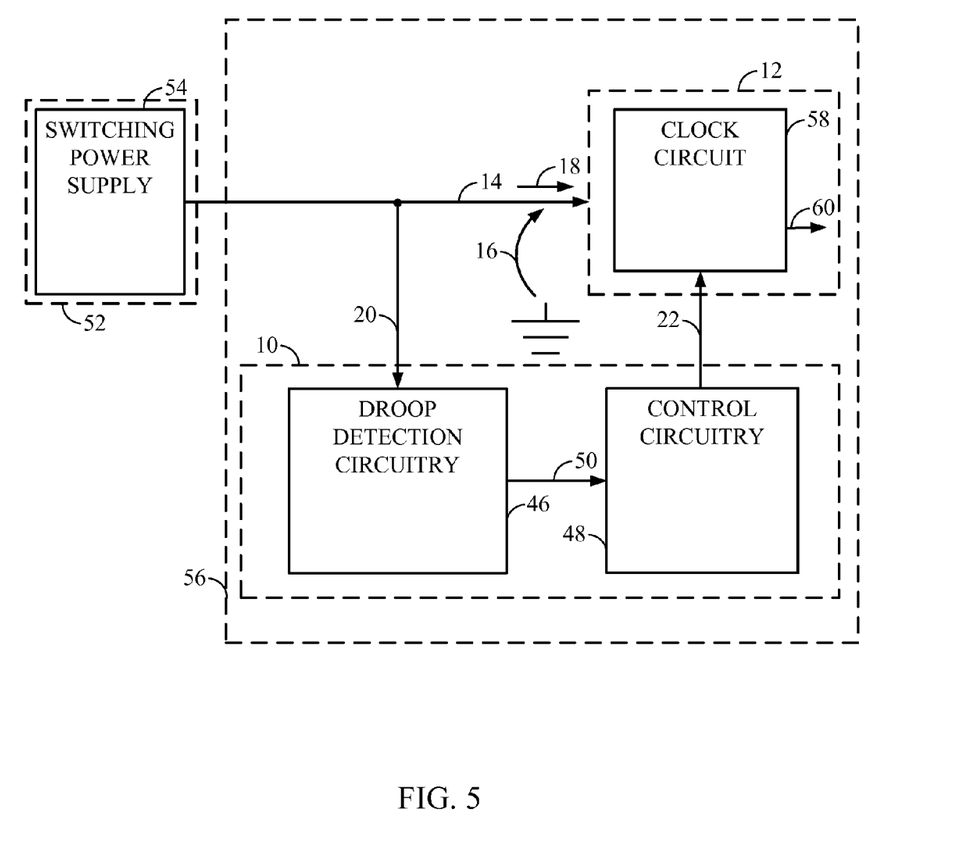
FIG. 5 is a block diagram of an exemplary semiconductor die, an alternate exemplary power supply, and an alternate exemplary functional circuit associated with the alternate exemplary voltage monitoring circuit and the exemplary functional circuit illustrated in FIG. 4.

A semiconductor die may provide many of the circuit elements illustrated in FIG. 4. Additionally, the power supply 52 may be a switching power supply. As such, FIG. 5 is a block diagram of an exemplary embodiment of a semiconductor die 56 that includes an alternate embodiment of the functional circuit 12 and an alternate embodiment of the power supply 52, each associated with the voltage monitoring circuit 10 and the functional circuit 12 illustrated in FIG. 4. In this embodiment, the power supply 52 includes a switching power supply 54 which provides the power supply signal 14 to the functional circuit 12. The semiconductor die 56 includes the functional circuit 12 and the voltage monitoring circuit 10 illustrated in FIG. 4. The voltage monitoring circuit 10 includes the droop detection circuitry 46 and the control circuitry 48. The functional circuit 12 includes a clock circuit 58 that provides a first clock signal 60 to the functional circuit 12. The clock circuit 58 operates in either the first mode or the second mode based on the mode status information 22.

In this embodiment, during the first mode, the first clock signal 60 has a first frequency. During the second mode, the first clock signal 60 has a second frequency which is less than the first frequency. As a result, the second minimum acceptable operating voltage 36 for the functional circuit 12 may be less than the first minimum acceptable operating voltage 34. Further, the second magnitude of the power supply current 18 may be less than the first magnitude of the power supply current 18. The functional circuit 12 is configured to operate during the second mode by providing for the second minimum acceptable operating voltage 36 to be acceptable for properly operating the functional circuit 12. As a result, the functional circuit 12 can continue to operate during a voltage droop of the power supply signal 14 without increasing operating voltage, and as a result, without increasing operating margin of the power supply 52 to keep the power supply signal 14 above the first minimum acceptable operating voltage 34 during the power supply signal droop.

The clock circuit 58 may be provided in any circuit or method desired. For example, the clock circuit 58 could include a divide by two circuit to divide a clock signal by two to provide the first clock signal 60 to the functional circuit 12. Any other circuits and methods of adjusting the clock frequency of the first clock signal 58 can be provided in the clock circuit 58.

Figure 6:
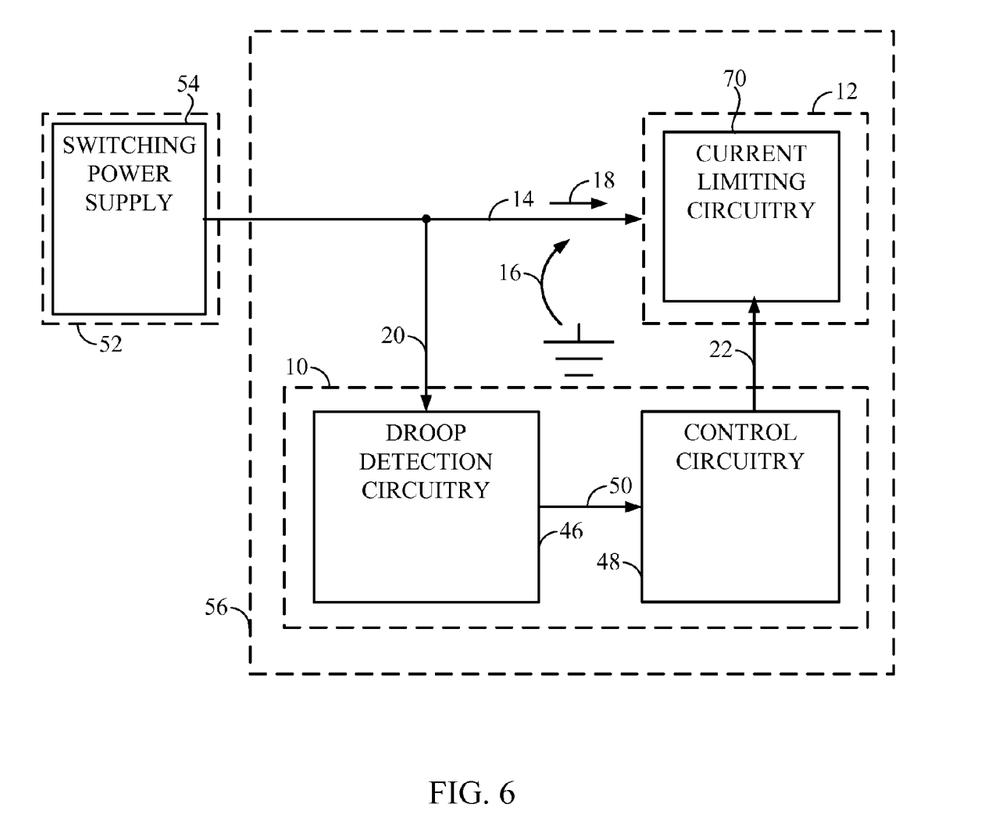
FIG. 6 is a block diagram of an additional exemplary functional circuit associated with the exemplary semiconductor die, the alternate exemplary voltage monitoring circuit, and the alternate exemplary power supply illustrated in FIG. 5.

As previously discussed, the functional circuit 12 may encompass several variations. As such, FIG. 6 is a block diagram of an additional embodiment of the functional circuit 12, which is associated with the semiconductor die 56, the voltage monitoring circuit 10, and the power supply 52 illustrated in FIG. 5. In this embodiment, the functional circuit 12 includes current limiting circuitry 70. The current limiting circuitry 70 operates in either the first mode or the second mode based on the mode status information 22. In one embodiment of the current limiting circuitry 70, while operating in the second mode, the power supply current 18 is based on the current limiting circuitry 70. While operating in the second mode, the current limiting circuitry 70 may limit digital operations of the functional circuit 12 thereby reducing current demand. For example, during the first mode, the power supply current demand by the functional circuit 12 may have a first magnitude. During the second mode, the power supply current demand by the functional circuit 12 may have a second magnitude, which is less than the first magnitude. As a result, the functional circuit 12 may continue to properly operate during a voltage droop of the power supply signal 14 without increasing operating voltage, and as a result, without increasing operating margin of the power supply 52.

The functional circuit 12 in FIG. 6 may include any type of circuit. For example, the functional circuit 12 could include processor-based circuitry. The control circuitry 48 in FIG. 6 could also include processor-based circuitry. As such, it may be beneficial to share processor-based resources. In this regard, for example, the droop detection circuitry 46 could include a comparator or other circuitry to determine power supply voltage droop.

Figure 7:
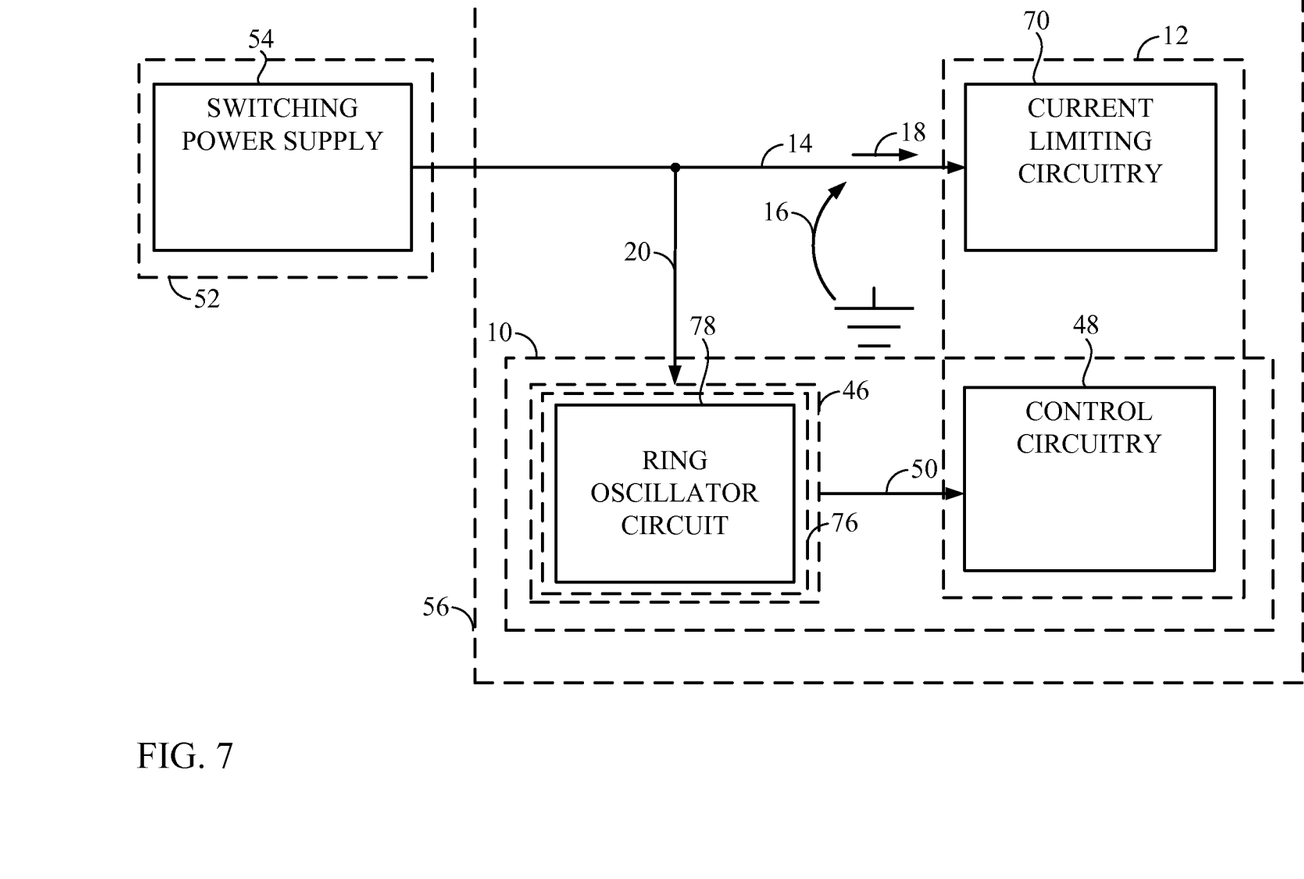
FIG. 7 is a block diagram of an alternate exemplary droop detection circuit associated with the further exemplary functional circuit, the exemplary semiconductor die, the alternate exemplary voltage monitoring circuit.

As discussed above, the droop detection circuitry 46 may encompass several variations. In this regard, FIG. 7 is a block diagram of an alternate embodiment of the droop detection circuitry 46 associated with the functional circuit 12, the semiconductor die 56, the voltage monitoring circuit 10, and the power supply 52 illustrated in FIG. 6. In this embodiment, the droop detection circuitry 46 includes digital circuitry 76 that may be employed to detect power supply voltage droop. The digital circuitry 76 may be powered using the power supply voltage 16 such that the performance of the digital circuitry 76 is indicative of the power supply voltage 16 in this embodiment. Because performance of the digital circuitry 76 is based on the power supply voltage 16 in this embodiment, determining if the power supply voltage 16 has drooped is based on the performance of the digital circuitry 76. As such, the droop status information 50 may be based on the performance of the digital circuitry 76. The digital circuitry 76 may be powered using the power supply voltage 16, such that the performance of the digital circuitry 76 may be based on the power supply voltage 16.

Further, as illustrated in FIG. 7, the digital circuitry 76 may include a ring oscillator circuit 78. The ring oscillator circuit 78 may be powered using the power supply voltage 16 such that the performance of the ring oscillator circuit 78 is indicative of the power supply voltage 16 in this embodiment. Specifically, as power supply voltages increases, oscillation frequencies tend to increase. Because performance of the ring oscillator circuit 78 is based on the power supply voltage 16 in this embodiment, determining if the power supply voltage 16 has drooped is based on the performance of the ring oscillator circuit 78. The performance of the ring oscillator circuit 78 may be based in particular on an oscillation frequency of the ring oscillator circuit 78. As such, the droop status information 50 may be based on the performance of the ring oscillator circuit 78 and the oscillation frequency of the ring oscillator circuit 78. Oscillation frequencies of ring oscillator circuits tend to directly follow power supply voltages of ring oscillator circuits. For example, the frequency of the ring oscillator circuit 78 can be estimated to determine if the power supply voltage 16 has drooped.

Figure 8:
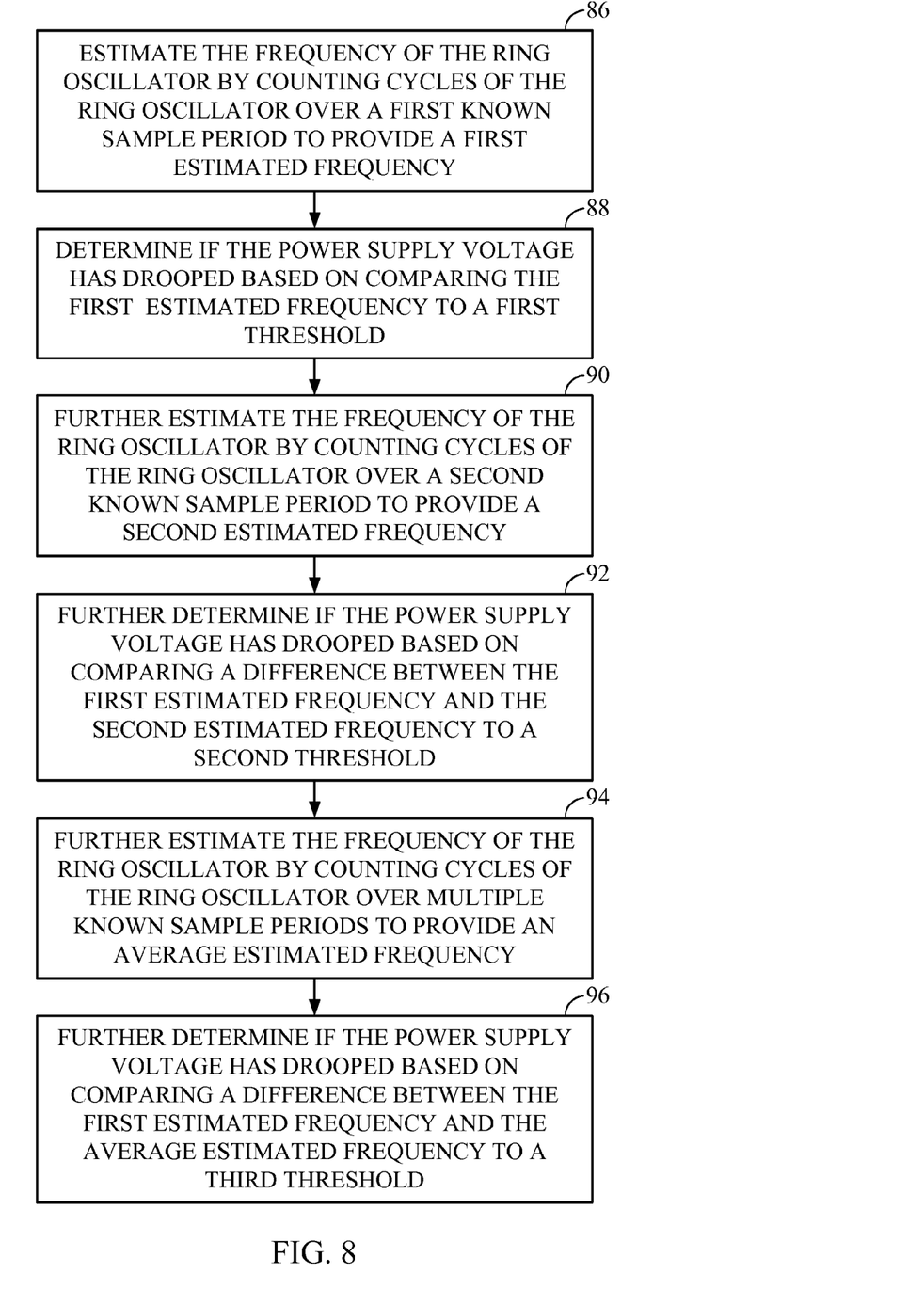
FIG. 8 is an alternate exemplary flowchart of a process for monitoring the power supply voltage using the exemplary ring oscillator circuit illustrated in FIG. 7.

As previously discussed, the ring oscillator circuit 78 may be used in several ways to determine if the power supply voltage 16 has drooped. As such, FIG. 8 shows an alternate embodiment of a flowchart for monitoring the power supply voltage 16 using the ring oscillator circuit 78 illustrated in FIG. 7. In this embodiment, a frequency of a ring oscillator associated with the ring oscillator circuit 78 is estimated by counting cycles of the ring oscillator over a first known sample period to provide a first estimated frequency (block 86). Determining if the power supply voltage 16 has drooped is based on comparing the first estimated frequency to a first threshold (block 88). The frequency of the ring oscillator associated with the ring oscillator circuit 78 is further estimated by counting cycles of the ring oscillator over a second known sample period to provide a second estimated frequency (block 90).

Further, determining if the power supply voltage 16 has drooped in this embodiment is based on comparing a difference between the first estimated frequency and the second estimated frequency to a second threshold (block 92). The frequency of the ring oscillator associated with the ring oscillator circuit 78 is further estimated by counting cycles of the ring oscillator over multiple known sample periods to provide an average estimated frequency (block 94). Further determining if the power supply voltage 16 has drooped is based on comparing a difference between the first estimated frequency and the average estimated frequency to a third threshold (block 96). In a first exemplary embodiment of the flowchart illustrated in FIG. 8, block 94 and block 96 are omitted. In a second exemplary embodiment of the flowchart illustrated in FIG. 11, block 90, block 92, block 94 and block 96 are omitted.

The voltage monitoring circuit 10 according to the designs and methods discussed herein may be included or integrated in the semiconductor die 56, integrated circuit, and/or device, including an electronic device and/or processor-based device or system. Examples of such devices include, without limitation, a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player.

Figure 9:
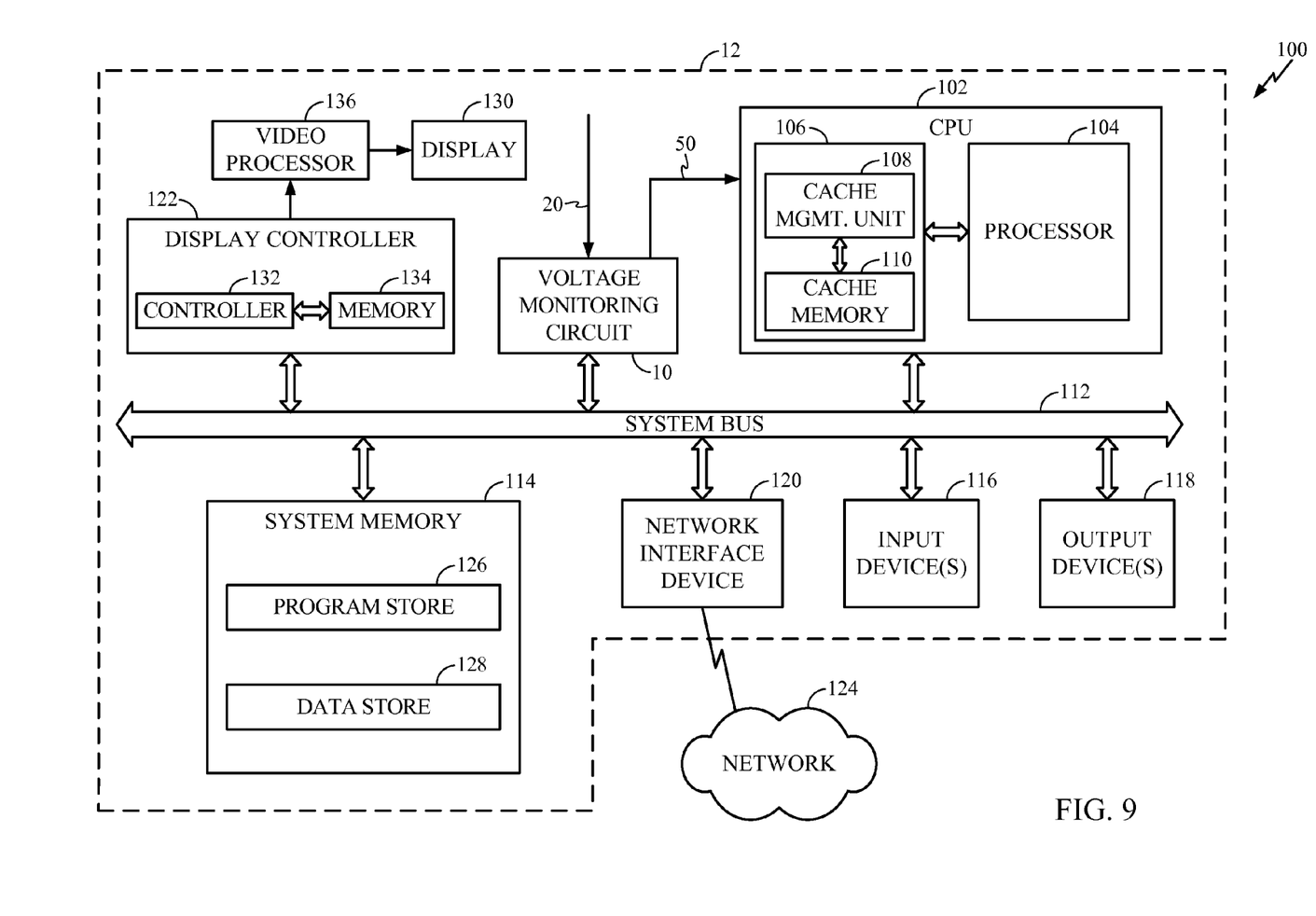
FIG. 9 is a block diagram of an exemplary processor-based system.

In this regard, FIG. 9 illustrates a processor-based system 100 that may employ the droop detection circuitry 46 and related circuits described above. In this embodiment, the processor-based system 100 may include the functional circuit 12. In this example, the processor-based system 100 includes a central processing unit (CPU) 102 that includes a processor 104, an integrated cache system 106, and the control circuitry 48 (not shown). The cache system 106 includes a cache management unit 108 that controls access to a cache memory 110 accessible to the processor 104 for rapid access to temporary storage for frequently accessed data. The voltage monitoring circuit 10 receives the signal 20, determines if the power supply voltage 16 has drooped based on the signal 20, and provides droop status information 50 to the CPU 102 based on detecting if the power supply voltage 16 has drooped.

The CPU 102 is coupled to a system bus 112, which interconnects the other devices included in the processor-based system 100. As is well known, the CPU 102 communicates with these other devices by exchanging address, control, and data information over the system bus 112. These devices may include any types of devices. As illustrated in FIG. 9, these devices may include the droop detection circuitry 46, system memory 114, one or more input devices 116, one or more output devices 118, a network interface device 120, and a display controller 122, as examples.

The one or more input devices 116 may include any type of input device, including but not limited to input keys, switches, voice processors, etc. The one or more output devices 118 may include any type of output device, including but not limited to audio, video, other visual indicators, etc. The network interface device 120 may be any device configured to allow exchange of data to and from a network 124. The network 124 may be any type of network, including but not limited to a wired or wireless network, private or public network, a local area network (LAN), a wide local area network (WLAN), and the Internet. The network interface device 120 may support any type of communication protocol desired.

The CPU 102 may also access the system memory 114 over the system bus 112. The system memory 114 may include circuits and methods previously described above to access the system memory 114. The system memory 114 may include static memory and/or dynamic memory. The system memory 114 may include a program store 126 and a data store 128 for the CPU 102. The CPU 102 may also access the display controller 122 over the system bus 112 to control information sent to a display 130. The display controller 122 may include a memory controller 132 and memory 134 to store data to be sent to the display 130 in response to communications with the CPU 102. The display controller 122 sends information to the display 130 to be displayed via a video processor 136, which processes the information to be displayed into a format suitable for the display 130. The display 130 may include any type of display, including but not limited to a cathode ray tube (CRT), a liquid crystal display (LCD), a plasma display, etc.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in memory, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that a processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A voltage monitoring circuit, comprising:
   droop detection circuitry configured to:
      receive a power supply signal from a power supply configured to supply power to a functional circuit, wherein the power supply signal is indicative of a power supply voltage supplied by the power supply to the functional circuit;
      detect if the power supply voltage of the power supply signal from the power supply has drooped; and
      generate droop status information indicating if droop was detected in the power supply signal; and
   control circuitry configured to:
      receive the droop status information;
      provide mode status information indicating a first voltage level performance mode to the functional circuit to cause the functional circuit to operate at a first minimum operating voltage, based on the received droop status information indicating no droop in the power supply signal; and
      provide mode status information indicating a second voltage level performance mode to the functional circuit to cause the functional circuit to operate at a second minimum operating voltage lower than the first minimum operating voltage level, based on the received droop status information indicating droop in the power supply signal.

2. The voltage monitoring circuit of claim 1, wherein the control circuitry is configured to:
   provide the mode status information indicating the second voltage level performance mode to the functional circuit to cause the functional circuit to operate at the second minimum operating voltage lower than the first minimum operating voltage that allows operation of the functional circuit, based on the received droop status information indicating droop in the power supply signal.

3. The voltage monitoring circuit of claim 1, wherein the droop detection circuitry comprises a ring oscillator circuit, the ring oscillator circuit configured to detect if the power supply voltage of the power supply signal from the power supply has drooped based on at least one oscillation frequency of the ring oscillator circuit.

4. The voltage monitoring circuit of claim 1, wherein the droop detection circuitry is configured to detect if the power supply voltage of the power supply signal has drooped based on a magnitude of the power supply voltage.

5. The voltage monitoring circuit of claim 4, wherein the droop detection circuitry is configured to detect if the power supply voltage of the power supply signal has drooped based on the magnitude of the power supply voltage being less than the magnitude of the power supply voltage during no droop of the power supply voltage.

6. The voltage monitoring circuit of claim 1 integrated in at least one semiconductor die.

7. The voltage monitoring circuit of claim 1, integrated into a device selected from the group consisting of a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player.

8. The voltage monitoring circuit of claim 1, comprising the functional circuit comprising current limiting circuitry configured to limit a current demand of the functional circuit in the second voltage level performance mode.

9. The voltage monitoring circuit of claim 3 further configured to:
estimate a first frequency of the ring oscillator circuit over a first known sample period; and
determine if the power supply voltage has drooped based on comparing the estimated first frequency to a first frequency threshold.

10. The voltage monitoring circuit of claim 3 further configured to:
determine a plurality of estimated frequencies of the ring oscillator circuit of one or more additional known sample periods;
determine an average estimated frequency of the plurality of estimated frequencies; and
determine if the power supply voltage has drooped based on comparing the estimated first frequency to a respective plurality of frequency thresholds.

11. The voltage monitoring circuit of claim 10, further configured to:
determine the average estimated frequency of the ring oscillator circuit based on averaging the plurality of estimated frequencies; and
determine if the power supply voltage has drooped based on comparing a difference between the average estimated frequency and a frequency threshold.

12. A voltage monitoring circuit, comprising:
a means for receiving a power supply signal from a power supply configured to supply power to a functional circuit, wherein the power supply signal is indicative of a power supply voltage supplied by the power supply to the functional circuit;
a means for detecting if the power supply voltage of the power supply signal from the power supply has drooped;
a means for generating droop status information indicating if droop was detected in the power supply signal by the means for detecting;
a means for providing mode status information indicating a first voltage level performance mode to the functional circuit to cause the functional circuit to operate at a first minimum operating voltage, based on the received droop status information indicating no droop in the power supply signal; and
a means for providing mode status information indicating a second voltage level performance mode to the functional circuit to cause the functional circuit to operate at a second minimum operating voltage lower than the first minimum operating voltage, based on the received droop status information indicating droop in the power supply signal.

13. A method for limiting power supply voltage droop, comprising:
receiving a power supply signal from a power supply configured to supply power to a functional circuit, wherein the power supply signal is indicative of a power supply voltage supplied by the power supply to the functional circuit;
detecting if the power supply voltage of the power supply signal from the power supply has drooped;
generating droop status information indicating if droop was detected in the power supply signal by the detecting;
providing mode status information indicating a first voltage level performance mode to the functional circuit to cause the functional circuit to operate at a first minimum operating voltage, based on the received droop status information indicating no droop in the power supply signal; and
providing mode status information indicating a second voltage level performance mode to the functional circuit to cause the functional circuit to operate at a second minimum operating voltage lower than the first minimum operating voltage, based on the received droop status information indicating droop in the power supply signal.

14. The method of claim 13, wherein providing the mode status information indicating the first voltage level performance mode comprises providing the mode status information indicating the first voltage level performance mode to the functional circuit to cause the functional circuit to operate at the first minimum operating voltage without a reduction in a minimum voltage level for the functional circuit, based on the received droop status information indicating no droop in the power supply signal.

15. The method of claim 13, wherein detecting if the power supply voltage has drooped comprises:
operating a ring oscillator powered by the power supply;
estimating a frequency of the ring oscillator to provide a first estimated frequency; and
estimating droop of the power supply voltage based on the first estimated frequency.

16. The method of claim 13, further comprising detecting if the power supply voltage of the power supply signal has drooped based on a magnitude of the power supply voltage.

17. The method of claim 16, comprising detecting if the power supply voltage of the power supply signal has drooped based on the magnitude of the power supply voltage being less than the magnitude of the power supply voltage during no droop of the power supply voltage.

18. The method of claim 13, wherein detecting if the power supply voltage has drooped comprises:
operating a ring oscillator powered by the power supply;
determine a plurality of estimated frequencies of the ring oscillator;

determine an average estimated frequency of the plurality of estimated frequencies; and
determine if the power supply voltage has drooped based on comparing the average estimated frequency to a frequency threshold.

19. A system for detecting power supply voltage droop, comprising:
a functional circuit configured to:
operate at a first minimum operating voltage, based on a received droop status information indicating no droop in a power supply signal; and
operate at a second minimum operating voltage lower than the first minimum operating voltage, based on the received droop status information indicating droop in the power supply signal, wherein the power supply signal is indicative of a power supply voltage supplied by a power supply to the functional circuit; and
a voltage monitoring circuit comprising:
droop detection circuitry configured to:
receive the power supply signal from the power supply configured to supply power to the functional circuit;
detect if the power supply voltage of the power supply signal from the power supply has drooped; and
generate the droop status information indicating if droop was detected in the power supply signal; and
control circuitry configured to:
receive the droop status information;
provide mode status information indicating a first voltage level performance mode to the functional circuit to cause the functional circuit to operate at the first minimum operating voltage, based on the received droop status information indicating no droop in the power supply signal; and
provide mode status information indicating a second voltage level performance mode to the functional circuit to cause the functional circuit to operate at the second minimum operating voltage lower than the first minimum operating voltage, based on the received droop status information indicating droop in the power supply signal.

20. The system of claim 19, wherein the voltage monitoring circuit is integrated into at least one semiconductor die.

21. The system of claim 20, wherein the functional circuit is integrated into the at least one semiconductor die.

22. The system of claim 19, wherein the control circuitry is configured to:
provide the mode status information indicating the second voltage level performance mode to the functional circuit to cause the functional circuit to operate at the second minimum operating voltage lower than the first minimum operating voltage that allows operation of the functional circuit, based on the received droop status information indicating droop in the power supply signal.

23. The system of claim 19, further comprising the power supply configured to supply the power supply signal to the functional circuit.

24. The system of claim 19, wherein the functional circuit comprises a current limiting circuitry configured to limit a current demand of the functional circuit in the second voltage level performance mode.

25. The system of claim 19, wherein the droop detection circuitry comprises a ring oscillator circuit, the ring oscillator circuit configured to detect if the power supply voltage of the power supply signal from the power supply has drooped based on at least one oscillation frequency of the ring oscillator circuit.

26. The system of claim 19, wherein the droop detection circuitry is configured to detect if the power supply voltage of the power supply signal has drooped based on a magnitude of the power supply voltage.

27. The system of claim 26, wherein the droop detection circuitry is configured to detect if the power supply voltage of the power supply signal has drooped based on the magnitude of the power supply voltage being less than the magnitude of the power supply voltage during no droop of the power supply voltage.

28. The system of claim 19 integrated in at least one semiconductor die.

29. The system of claim 19, integrated into a device selected from the group consisting of a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player.

* * * * *